United States Patent Office 3,160,551
Patented Dec. 8, 1964

3,160,551
HIGH-TEMPERATURE, HIGH-SOLVENT
RESISTANT ELASTOMER
Ralph W. Buetow, Madison, Wis., and Robert P. Cox,
606 University Ave., Madison, Wis., assignors, by mesne
assignments, of eighty percent to said Cox and twenty
percent to Johan Bjorksten, Houston, Tex.
No Drawing. Filed Oct. 3, 1960, Ser. No. 59,850
9 Claims. (Cl. 161—208)

This invention relates to a polymeric material formed from the condensation product of vinyl trialkoxy silane with itself to form a cyclic vinyl polysiloxane and a monomer adapted to undergo addition polymerization.

For the purpose of accurately describing and claiming this invention the term "polymer" will be used to mean "homopolymer," "copolymer" or "terpolymer" in accordance with the practice of Schmidt and Marlies' Principles of High-Polymer Theory and Practice, McGraw-Hill, 1948, first edition, page 15, who state therein that "the polymerization of two or more units, each of which is independently capable of polymerization, into the same chains is the process called 'polymerization.'"

This application is a continuation-in-part of application Serial No. 627,117, filed December 10, 1956, which is a continuation-in-part of application Serial No. 342,255, filed March 13, 1953, both of which are now abandoned.

A primary object of the present invention is to provide a polymerizable composition due to the presence therein of (1) at least one unsaturated group known more specifically as a vinyl or ethylene group and (2) cyclic unsubstituted vinyl polysiloxane. Such cyclic vinyl polysiloxane is preferred to the alkyl substituted polysiloxanes such as methyl and ethyl vinyl polysiloxane. The cyclic unsubstituted vinyl polysiloxane is sold by the Silicon Division of Union Carbide and Carbon Corp. under the name of X–31.

While we are not certain of the exact structure of the cyclic vinyl polysiloxane, we are certain that it is a cyclic polymer produced by high temperature condensation of a vinyl trialkoxy silane to produce hydrolytic condensation of the silane groups thus giving a cyclic polymer generally containing at least ⅛ and not over 2 vinyl groups for each silicon atom and having an average weight generally in the approximate neighborhood of 5,000; each typical molecule is believed to generally contain a plurality of rings which are predominantly eight-membered. We believe that the condensation product of the vinyl trialkoxy silane consists of an arrangement of atoms, the arrangement being:

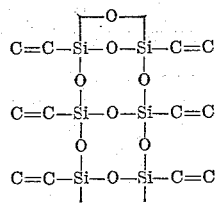

wherein the end siloxane units are either blocked or joined by an oxygen bridge and each silicone atom is attached to three oxygen atoms and to one vinyl group.

We have found by modifying esters of acids having an alpha-beta unsaturation by polymerizing these esters with a small amount of the cyclic unsubstituted polysiloxane resins shown above, we produce a polymer that is highly scratch and solvent-resistant and can withstand high temperatures.

The trifunctional silane monomer which upon condensation will form the cyclic unsubstituted polysiloxane may be represented by the general formula:

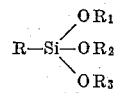

where R is a monovalent unsaturated vinyl radical and $R_1$, $R_2$, and $R_3$ are monovalent saturated hydrocarbon radicals containing between 1 and 5 carbon atoms. $R_1$, $R_2$ and $R_3$ may be similar or different hydrocarbon radicals. The condensation reaction may be carried out hydrolytically at room temperature to produce the cyclic unsubstituted vinyl polysiloxane but it is preferred to use temperatures which are between 100°–400° C. The preferred compound that is used in accordance with our invention is the condensation product of monovinyl ethoxy silane (X–31 sold by the Silicon Division of Union Carbide and Carbon Corporation).

It has previously been proposed to co- or inter-polymerize organic substances capable of undergoing such reactions with certain esters of silicic acid in which the ester group is an alkenyl radical such as an allyl radical. However, due to the fact that such esters are easily hydrolized, the resultant products, whether in the form of moldings, sheets, films, coatings or the like, have a tendency to deteriorate in the presence of moisture and therefore have little commercial utility. The polymeric products of the present invention are primarily distinguished from such products by the fact that they are very resistant to attack by moisture as a result of their chemical dissimiliarity.

It has also previously been proposed to co- or inter-polymerize certain alkenyl silanes and alkyl substituted vinyl polysiloxanes with polymerizable organic compounds capable of undergoing polymerization of vinyl or addition mechanism due to the presence therein of at least one vinyl or ethylenic group but such co- or inter-polymers have generally been hard, brittle and unusable or else have been soft gels in some cases and therefore lacking in commercial usefulness. Many have been weak and cheesy and have been subject to degradation with resultant discoloration upon subjection to elevated temperatures for long or shorter periods and have thus lacked commercial practicability.

It has been characteristic of such compositions of alkenyl silanes polymerized with compounds capable of addition or vinyl polymerization that a high proportion of vinyl silane has been used, generally on the order of 20 to 60% but never less than 10%.

We have discovered that by copolymerizing a cyclic unsubstituted vinyl polysiloxane as described above with a polymerizable organic compound characterized by the presence of a polymerizable unsaturated group within the molecule, instead of those silanes, silanols and the like which have heretofore been proposed, and by utilizing extraordinarily low concentrations of said vinyl polysiloxane, remarkably superior polymeric products are obtained. According to our invention it is generally unsuitable to use more than 5% of vinyl polysiloxane in the composition; generally from about .1 to 2.5% is preferable.

Various polymerizable organic compounds which are characterized by the presence of a polymerizable unsaturated group may be employed in the practice of the present invention. For example the following are suitable: methylacrylic acid, methyl methacrylate, ethyl methacrylate, n-propyl methacrylate, isopropyl methacrylate, n-butyl methacrylate, isobutyl methacrylate, cyclohexyl methacrylate, acrylic acid, methyl acrylate, ethyl acrylate, n-propyl acrylate, isopropyl acrylate, n-butyl acrylate, isobutyl acrylate, cyclohexyl acrylate, alpha-chloracrylic acid, methyl alpha-chloroacrylate, ethylalpha-chloroacrylate, n-propyl alpha-chloroacrylate, isopropyl alpha-chloroacrylate, n-butyl alpha-chloroacrylate, iso-butyl alpha-chloroacrylate, cyclo-hexyl alpha-chloroacrylate, vinyl methacrylate, vinyl acrylate, vinyl alpha-chloroacrylate, allyl acrylate, allyl methacrylate, allyl alpha-chloroacrylate, beta methylallyl acrylate, beta methylallyl methacrylate, beta methylallyl alpha-chloroacrylate, etc.

One of the greatest drawbacks to the use of polymethylmethacrylate sheets or sheets of other acrylic synthetic resins in place of glass for many applications has been the low mar-resistance, solvent-resistance and scratch-resistance of polymethyl methacrylate and other acrylic resins. Certain coating materials have heretofore been used for acrylic resins which have provided transparent acrylic sheets having the mar-resistance of the coating material. Sheets thus coated have been superior to some extent in surface properties to polymethyl methacrylate. However, no such coating has heretofore been found which provided a generally satisfactory degree of mar-resistance and scratch-resistance.

Such coating materials have had the additional disadvantage in many instances that they have not been as resistant to high temperatures as polymethyl methacrylate itself. We have invented a novel coating composition which provides superior properties of mar-resistance, scratch-resistance, and resistance to high temperatures.

The coatings according to our invention are free from "popcorn" effect and are generally altogether free from cracks resulting from crazing by solvents or brittleness or lack of coherency in the coating and are free from brittleness which is adapted to permit the formation of such cracks and are generally strong, tough and hard without having characteristics of cheesiness or other structural defects.

Flexible transparent adherent interlayer materials have heretofore been provided between sheets of polymethyl methacrylate and other transparent acrylic resins and between sheets of glass in order to provide relatively shatter-proof transparent laminated structures for use primarily in automobiles and aircraft. A satisfactory interlayer for such purposes must have a large number of superior physical properties. It must have high adhesion for glass or polymethyl methacrylate or other acrylic resins; it preferably should continue to function to prevent shattering of the glass or acrylic resin at both extremely low temperatures and extremely high temperatures, more specifically at temperatures as low as −60° F. and as high as 400° F. and consequently it must retain its flexibility, its adherency for acrylic resin or glass and its cohesivity or tensile strength at such temperatures. It also must remain clear and transparent at such temperatures, without colorization and of course it must not delaminate as a result of formation of gas bubbles due to degradation of the interlayer material. Cellulose acetate and polyvinyl butyral have conventionally been used for such interlayer materials and many other interlayer materials have been proposed. We have developed an interlayer material which we believe to be markedly superior to any prior material utilizable for this purpose.

The interlayer material utilized in the composition of our invention is characterized by remarkably high strength when subjected to elevated temperature such as 400° F. for a long period of time while simultaneously retaining its properties of water-white transparency, characterized by not undergoing degradation and discoloration at such temperatures. Furthermore, such interlayers are free from "popcorn" effect and from cracks and crazing due to low solvent resistance or inherent brittleness and are not in any way crumbly or cheesy or otherwise structurally unsound.

Polymethyl methacrylate has found wide acceptance for use in the form of sheets as a window material. Examples of such applications are cock-pit canopies, bomb-bay windows and observation windows in aircraft. At the supersonic speeds at which modern aircraft presently fly, high temperatures are developed in the skin and the aircraft due to friction with air molecules. The strength of polymethyl methacrylate and other acrylic resins is decreased at such temperatures and particularly, at temperatures above about 350 or 375° F. Presently known acrylic resins and particularly polymethyl methacrylate and even those polymethyl methacrylate sheets sold commercially as Lucite HC 202 which are particularly well adapted to resist high temperatures all tend to become soft and flowable and entirely useless for such glazing applications. We have developed a new polymeric material which has sufficient strength at high temperatures to be utilizable for such applications where acrylic resins of the prior art would be useless. Substantially rigid transparent sheets, adapted for aircraft and automobile glazing purposes, utilizing the composition of our invention, resist high temperatures for long periods without loss of strength or discoloration and are entirely free from such structural and optical defects as "popcorn," cracks, brittleness, crumbliness and cheesiness.

It has heretofore been commercially impractical to provide an optically transparent resinous polymer. According to our invention we can provide a polymer having elastomeric properties which is not only optically transparent but has a high tensile strength and retains its tensile strength when subjected to elevated temperatures without any accompanying discoloration. Furthermore, the polymer has low hysteresis.

In addition the polymer of our invention may be utilized as a very effective adhesive which maintains its strength at both high and low temperatures.

An object of this invention is to provide a polymeric material comprising the condensation product of vinyl trialkoxy silane and a polymer formed from a monomer adapted to undergo addition polymerization by means of the presence of the unsaturated polymerizable vinyl or ethylene group, such as acrylic of methacrylic or alpha-chloroacrylic acid or one or more of the esters of one or more of these acids.

Another object is a sheet comprising such a composition and being optically transparent and having elastomeric properties.

Another object is a substantially hard rigid transparent heat-resistant, mar-resistant laminated sheet comprising material of the above composition.

Another object is a transparent laminated article containing a flexible adherent heat-resistant interlayer according to the above composition.

Another object is a coating material comprising the above composition.

Another object is a sheet of substantially rigid transparent material such as glass or polymethyl methacrylate or other acrylic resin coated with said polymeric composition, having superior adhesion between the coating and the polymethyl methacrylate and having a surface more craze-resistant, mar-resistant, scratch-resistant, abrasion-resistant and temperature-resistant than those heretofore known.

Further objects will become apparent from the following detailed description in which it is our intention to illustrate the applicability of the invention without intending to limit its scope to less than that of all equivalents which will be apparent to those skilled in the art.

According to a preferred embodiment of the invention, we mix about 5 parts of the product formed by the cyclic condensation of vinyl trialkoxy silane with about 400 to 1,000 parts of an acrylic monomer such as methyl methacrylate, ethyl methacrylate or butyl methacrylate. We then add about .01 part of a suitable polymerizing catalyst such as benzoyl peroxide or ditertiary butyl peroxide and polymerize the mixture under suitable conditions. The polymerization may be conducted under ultraviolet light to increase the rate of polymerization; heating for 2 hours at 30° C. under an atmosphere of $CO_2$ has been found suitable to complete polymerization to the desired point.

The condensation of a vinyl trialkoxy silane such as vinyl triethoxy silane is preferably carried by heating the compounds to 150° C. in the presence of an acid or an alkali to produce hydrolysis. It is possible to vary the conditions so that the monomer hydrolyzes to form the polymeric cyclic polysiloxane. In order to achieve the desired cyclic polysiloxane by condensation it is important that the starting monomeric vinyl trialkoxy silane be unsubstituted and hence vinyl trialkoxy silane is preferred to alkyl substituted alkenyl trialkoxysilanes such as methyl or ethyl vinyl or allyl trialkoxy silanes. The alkyl radical is preferably a monovalent hydrocarbon containing one or two carbon atoms. But good results have been obtained with straight chain hydrocarbon radicals having up to five carbon atoms such as vinyl tripropoxy silane, vinyl tributoxy silane or vinyl tripentoxy silane. Incompletely polymerized mixtures of the cyclic condensation product of vinyl trialkoxy silane and the acrylate monomer may be applied as a coating on polymethyl methacrylate sheets and subsequently fully cured, that is fully polymerized, in situ to provide a superior coating for polymethyl methacrylate or acrylic resin sheets or for other materials. Prior to being completely polymerized the mixture may be pressed as an interlayer between sheets of glass or sheets of polymethyl methacrylate. The assembly may then be cured to completely polymerize the interlayer material. Generally glass has been used for formation of such laminates because the interlayer has a much higher temperature resistance than polymethyl methacrylate itself.

The above composition, utilizing butyl methacrylate may be polymerized to provide an interlayer between sheets of glass. The resulting new laminate has properties at high temperatures such as 400° or 450° F. superior to all transparent laminates known heretofore.

It may be mentioned further that in order to provide a useful laminate comprising sheets of acrylic resin, it is necessary that the interlayer material be such that the laminate may be formed into shaped articles such as domes and other deep drawn shapes or blown shapes after the laminate has been assembled, which requires that the interlayer material be such that it may be formed in the same manner and at the same temperature as the polymethyl methacrylate. The copolymer of our invention fulfills this requirement of an interlayer material for use between sheets of polymethyl methacrylate.

The following examples illustrate the invention in greater detail. All parts shown are by weight.

Example I

To 1,000 grams of vinyl triethoxy silane in 2 liters of diethyl ether were added slowly 500 grams of water. The reaction mixture was maintained at 25° C. during the addition. The ether layer was removed, washed several times with water, ammonia was bubbled through and the product was again washed with water. After removal of ether and water, there remained a colorless, very viscous oil.

To 385 grams of the oily product of hydrolysis were added 7.7 grams of powdered sodium hydroxide. The mixture was heated on a molten metal bath the temperature of which was about 380° C., and the volatile products were collected and condensed water collected in a cold trap attached to the condenser. The principal product distilled at a temperature within the range of from 200°–270° C. at an absolute pressure of from .1 to .05 millimeters. It amounted to 333 grams and was solid at room temperature.

Example II

About 20.9 grams of vinyl trimethoxy silane together with 100 ml. of acetone and 10 ml. of .1 N HCl were placed in a reaction vessel fitted with a reflux condenser. The material was refluxed at 137° C. for four hours and the acetone was distilled off until two phases appeared in the residue. The non-aqueous phase was separated and the aqueous phase further distilled until acetone ceased evolving. The non-aqueous phase was again separated and both siloxane fractions were combined. After drying the latter combined fractions over calcium chloride, they were distilled to give approximately a 61% yield.

Example III 9.8 grams of ethyl acrylate, 2 grams of X–31 (cyclic unsubstituted vinyl polysiloxane formed by the condensation of vinyl triethoxy silane sold by Union Carbide and Carbon Co.) and .01 gram benzoyl peroxide were heated in a 4-necked flask equipped with a thermometer well, reflux condenser, stirrer, and $CO_2$ inlet. The agitated mixture was kept at a temperature of 40–45° C. for four hours. The temperature was then slowly increased to 70° C., when the solution became viscous. After chilling to 35° C., the solution was cast between sheets of glass. Each of the resultant glass laminates was cured for 3 hours at 50° C., 2 days at 70° C., one day at 100° C., 8 hours at 120° C. and 2 hours at 163° C. The fully cured laminates were shatter resistant at 200° C. and at 0° C. and showed no ill effects after storage at 200° C. for 3 hours.

Similar laminates comprising polymethyl methacrylate sheets as the outer layer were shatter-resistant at 30° F. and at 200° F.

Free films of the fully cured interlayer material of this example exhibited pronounced elastomeric properties in the range 0° F. to 400° F., and showed no adverse effects upon storage for 3 hours at 400° F. These films were clear and colorless.

Example IV 60 grams of n-butyl methacrylate, 1 gram of cyclic vinyl polysiloxane, prepared in accordance with Example I, 40 grams of methyl acrylate and .1 gram benzoyl peroxide were heated under $CO_2$ atmosphere for 4 hours at 40° C., 4 hours at 50° C. and the temperature was then raised slowly to 110° C., at which temperature the solution became very viscous. Laminates were prepared by casting the chilled solution between polymethyl methacrylate and glass outerlayers and the laminates were each cured for 3 days at 60° C., 2 days at 80° C., 1 day at 100° C. and 12 hours at 135° C. The resultant cured laminates were shatter-resistant at −10° F. and were stable to discoloration and degradation at 390° F.

Free films cast from the above solution and cured 10 days at 80° C. exhibited elastic properties, but the elastic response was slow at temperatures below 10° F. These films were clear and colorless and did not soften at 425° F.

Example V

A solution of 80 parts n-butyl methacrylate, 20 parts n-hexyl methacrylate and .5% benzoyl peroxide was split into two portions. To one was added .5 gram of cyclic vinyl polysiloxane, prepared in accordance with Example II. Both solutions were heated four hours at 70° C. in a nitrogen atmosphere. The siloxane-containing syrup was clear and colorless. The solution containing no siloxane was yellow. It is believed that the presence of the vinyl polysiloxane stabilized the former solution.

Example VI 95 grams ethyl acrylate, 5 grams of vinyl 2-chloro ethyl ether and .1% benzoyl peroxide were heated at 37° to 40° C. under $CO_2$ for one hour. 2 grams of cyclic vinyl polysiloxane prepared in accordance with Example I was then added, and the heating was continued for an additional two hours. The temperature was raised to 80° C., at which point the solution became very viscous. .1 gram of cobalt naphthenate was then added, the resultant solution was cast into sheets and cured 7 days at 80° C. The resultant sheets were extremely flexible at 0° F.

Example VII 95 grams of 2-chloroethyl acrylate, 2 grams of cyclic vinyl polysiloxane (X–31) and 5 grams of ditertiary butyl peroxide were heated with stirring in an $N_2$ atmosphere. The temperature was raised from 30° C. to 95° C. over a period of 6 hours. The final viscous solution was cast between sheets of polymethyl alpha-chloroacrylate and cured 3 days at 60° C., 2 days at 80° C., 1 day at 100° C., 12 hours at 120° C. and 1 hour at 165° C. The adhesion and shatter-resistance of the final laminate were excellent at 10° F. to 350° F.

A free film of the above casting syrup was found to be clear, colorless and elastomeric.

Example VIII 99 grams of butyl methacrylate, 1 gram of cyclic vinyl polysiloxane (X–31) and .01 gram of benzoyl peroxide were heated at 110° C. for two hours, after which time, the viscous solution was cast between glass plates and cured 6 days at 80° C. plus 6 hours at 150° C. The resulting laminates remained shatter-resistant, clear, colorless and free from optical defects even after continuous storage at 400° F. for 10 hours.

Example IX 70 grams of butadiene, 30 grams of acrylic acid, 1 gram of cyclic vinyl polysiloxane (X–31) and .1 gram of benzoyl peroxide are polymerized and cast into sheets. After a 7 day cure at 80° C. these sheets are elastomeric and resistant to discoloration or degradation at 400° F.

Example X

The procedure of Example IX is repeated, using 40 grams of styrene in place of the acrylic acid.

Example XI 40 parts propyl acrylate, 50 parts of methyl acrylate, 10 parts beta-chloroethyl methacrylate, 2 parts cyclic vinyl polysiloxane (X–31) and .25 parts benzoyl peroxide were heated to give a viscous syrup which was cast into films and cured. The tensile strength of the final material was 900 p.s.i. at room temperature and 160 p.s.i. at 90° C. These samples were elastomeric and exhibited a quick recovery. A strip was elongated 200% for five minutes and released. The recovery was 95% after 5 seconds and 100% after 20 seconds.

Example XII

The casting syrup of Example VIII was coated on a strip of mildly vulcanized Hevea rubber and cured 6 days at 50–60° C. The resultant sample showed no decrease in flexibility and the thermal resistance of the Hevea rubber was definitely improved.

Example XIII

Ethyl acrylate (100 grams) and benzoyl peroxide (.1%) were heated with various concentrations of cyclic vinyl polysiloxane (X–31) and cast into free films. The following results were obtained:

| Percent Siloxane | Flexibility at 5° F. | Flexibility at 65° F. | Other Observations |
|---|---|---|---|
| .25 | O.K. | O.K. | Slightly tacky at 400° F. |
| 1.0 | O.K. | O.K. | O.K. at 400° F. |
| 2.0 | O.K. | O.K. | O.K. at 400° F. |
| 3.0 | Slightly Brittle | O.K. | O.K. at 400° F. |
| 5.0 | Brittle | Slightly Brittle | O.K. at 400° F. |
| 25.0 | Brittle | Brittle | Friable at 400° F. |

Thus, the optimum concentration of cyclic vinyl polysiloxane is seen to be about .25 to 2% and the maximum preferable concentration is seen to be about 5%.

Example XIV 50 grams of n-butyl acrylate and 50 grams of n-butyl methacrylate were polymerized to a tough rubber and compounded with 1 part cyclic vinyl polysiloxane (X–31) and cured 3 days at 80° C. plus 3 hours at 120° C. The original rubber was thermoplastic and was quickly discolored at 400° F., whereas the siloxane-modified rubber was dimensionally stable and thermally resistant at this temperature.

Examples XV–XIX

In each of the following examples the listed monomer was copolymerized with 1% cyclic vinyl polysiloxane (X–31) and .25% benzoyl peroxide.

| Example | Monomer | Properties of Cast and Cured Polymer |
|---|---|---|
| XV | Styrene | Increased scratch resistance, great dimensional and color stability at 100° C. |
| XVI | Methyl alpha-chloroacrylate | Resistance to discoloration at 150° C. |
| XVII | Polyester composed of ethylene glycol reacted with maleic acid. | Increased surface-hardness and increased thermal stability. |
| XVIII | Polyester composed of propylene glycol with 50–50 dichloromaleic anhydride adipic acid. | Increased thermal stability. |
| XIX | Methyl methacrylate | Increased thermal resistance and also increased mar-resistance. |

Example XX

Cyclic vinyl polysiloxane (X–31) was copolymerized (said copolymerization being carried out in two stages; that is, first prepolymerizing and then curing in the manner described below) with methyl methacrylate and applied as a surface coating on polymethyl methacrylate sheets. The monomer mixtures were prepolymerized for various lengths of time at 80° C. prior to application. The coated sheets were cured 3 days at 80° C. plus 2 hours at 165° C. and tested for abrasion, scratch and craze resistance. In the craze tests, acetone was applied to the flexed sheet of coated material. The scratch-resistance was noted after vigorously brushing the sample with a wire brush. Abrasion-resistance was determined by abrading with 2,000 grams of Carborundum #80 grit falling 30 inches. All samples were coated on ½ of their surface; the coated portion was then easily checked against the uncoated portion.

| Percent Cyclic Vinyl Polysiloxane | Prepolymerization time, hrs. | Scratch Resistance | Abrasion Resistance | Craze Resistance |
|---|---|---|---|---|
| 2.5 | 1 | Poor | Poor | Poor. |
|  | 2 | do | do | Do. |
|  | 3 | do | do | Do. |
|  | 4 | Good | Excellent | Good. |
| 5 | 1 | Poor | Good | Excellent. |

Example XXI 50 parts methyl methacrylate, 45 parts methyl alpha-chloroacrylate and 5 parts of cyclic vinyl polysiloxane (X–31) were prepolymerized at 70° C. in the presence of .5% benzoyl peroxide for one hour. When coated on the surface of a sheet of polymethyl alpha-chloroacrylate, and cured, the scratch, abrasion and craze resistance (to ethylene dichloride) were notably increased.

Example XXII 35 parts ethyl acrylate, 10 parts of ethyl methacrylate, 5 parts of methacrylic acid and 2.5 parts cyclic vinyl polysiloxane (X–31) were polymerized to a syrup and applied to the outer surface of a glass fiber reinforced polyester laminate. After curing, the abrasion resistance was considerably increased.

Example XXIII

When 10% of the epoxy resin sold comercially as Epon 1062 was added to the syrup of Example XXI, the adhesion was greatly increased, without decreasing the mar and abrasion resistance.

*Example XXIV*

95 grams of styrene was copolymerized with 5 grams of cyclic vinyl polysiloxane (X–31) applied to a polystyrene sheet and cured. The coated sheet possessed greatly increased resistance to solvents for the polystyrene base material. The weather-resistance was also considerably improved. Mar and scratch-resistance were vastly improved.

*Example XXV*

45 grams of vinyl acetate, 50 grams of methyl methacrylate and 5 grams of cyclic vinyl polysiloxane (X–31) were copolymerized and coated on a sheet of polyvinyl acetate. After curing, the dimensional stability at elevated temperatures of the coated sheet was considerably increased.

The vinyl siloxane used in the examples is cyclic unsubstituted vinyl siloxane containing about 1 vinyl group per silicon atom and three oxygen groups per silicon atom and having a molecular weight of 1000–10,000.

It may thus be seen from the examples that our invention broadly relates to a composition comprising .1% to 5% of the cyclic vinyl polysiloxane as described hereinabove and 99.9% to 95% of an organic compound being characterized by the presence therein of a polymerizable ethylenic radical.

More than one organic compound characterized by the presence of a polymerizable ethylenic radical may be in the composition. As much as 5.0% and as little as 0.1% of the first component may be used with 95.0% to 99.9% of the second component but .5% to 2.5% of the first and 99.5% to 97.5% of the second are preferable.

The resulting composition may be either a copolymer, or an interpolymer of 2, 3, 4 or more polymerizable substances or may be a partial copolymer, that is, it may be partially a mixture and partially a co- or interpolymer.

The superiority of the transparent material produced in accordance with our invention will be recognized when it is noted that the properties of polymethyl methacrylate are stated by well-known hand books to be as follows: compression molding temperature=300–375° F.; injection molding temperature=350–475° F.; the temperature which the material will undergo continuously is, for cast resin, 140–200° F., and for molded resin, 155–190° F.; heat distortion takes place in the cast material at 150–210° F. and in molded material at 160–195° F.

Having thus disclosed our invention, we claim:

1. A mar-resistant, scratch-resistant material formed by the polymerization of a composition comprising .1% to 5% by weight of a cyclic unsubstituted vinyl polysiloxane containing silicon and oxygen atoms and vinyl radicals, wherein substantially each of the silicon atoms is bonded to substantially three oxygen atoms and substantially one vinyl radical, and 99.9 to 95% by weight of an organic compound containing a polymerizable ethylenic radical, said organic compound being capable of copolymerizing with said cyclic polysiloxane.

2. A mar-resistant scratch-resistant material formed by the polymerization of a composition comprising .1% to 5% by weight of a cyclic unsubstituted vinyl polysiloxane containing silicon and oxygen atoms and vinyl radicals wherein substantially each of the silicon atoms is bonded to substantially at least three oxygen atoms and substantially one vinyl radical and 99.9 to 95% by weight of at least one monomer of the formula:

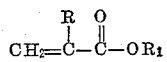

and $R_1$ is a monovalent aliphatic hydrocarbon radical containing from one to five carbon atoms, and R is selected from the group consisting of —H and —CH$_3$, said monomer being capable of polymerizing with said polysiloxane.

3. A mar-resistant, scratch-resistant material formed by the polymerization of a composition comprising .1% to 5% by weight of a cyclic unsubstituted vinyl polysiloxane containing silicon and oxygen atoms and vinyl radicals, wherein substantially each of the silicon atoms is bonded to substantially three oxygen atoms and substantialy one vinyl radical and 99.9 to 95% by weight of at least one compound selected from the group consisting of methyl methacrylate, ethyl acrylate, methyl acrylate, ethyl methacrylate, methyl acrylate, propyl acrylate, chloroethyl acrylate, butyl methacrylate, propyl methacrylate, butyl acrylate, methyl chloroacrylate, vinyl chloroacrylate, vinyl acrylate, vinyl methacrylate, acrylic acid and methacrylic acid.

4. A mar-resistant, scratch-resistant material formed by the polymerization of a composition comprising .1% to 5% by weight of a cyclic unsubstituted vinyl polysiloxane containing silicon and oxygen atoms and vinyl radicals, wherein substantially each of the silicon atoms is bonded to substantially three oxygen atoms and substantially one vinyl radical and 99.9% to 95% by weight of at least one polymer of the formula:

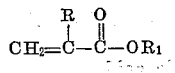

where R is selected from the group consisting of —H and —CH$_3$ radicals and $R_1$ is a bivalent aliphatic hydrocarbon radical containing from one to five carbon atoms, said polymer being capable of copolymerizing with said polysiloxane.

5. A mar-resistant, scratch-resistant material formed by the polymerization of a composition comprising .1 to 5% by weight of a cyclic unsubstituted vinyl polysiloxane containing silicon and oxygen atoms and vinyl radicals, wherein substantially each of the silicon atoms is bonded to substantially three oxygen atoms and substantially one vinyl radical and 99.9 to 95% by weight of a mixture of at least one monomer of the formula

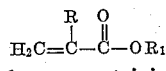

and at least one polymer containing the formula

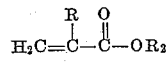

where in each of the formulas R is selected from the group consisting of —H and —CH$_3$ and wherein $R_1$ is a monovalent aliphatic hydrocarbon radical containing from one to five carbon atoms and $R_2$ is a bivalent hydrocarbon radical containing from one to five hydrocarbon radicals, said monomer and polymer being capable of copolymerizing with said polysiloxane.

6. A transparent shatter-resistant article comprising two transparent polyacrylic resin sheets, said sheets having an adhesive disposed thereinbetween said adhesive comprising the polymerization product of .1% to 5% by weight of a cyclic unsubstituted vinyl polysiloxane containing silicon and oxygen atoms and vinyl radicals wherein substantially each of the silicon atoms is bonded to substantially three oxygen atoms and substantially one vinyl radical, and 99.9 to 95% by weight of an organic compound containing a polymerizable ethylenic radical, said radical being capable of copolymerizing with said cyclic polysiloxane.

7. A transparent shatter-resistant article comprising two transparent polyacrylic resin sheets, said sheets having an adhesive disposed thereinbetween, said adhesive comprising the polymerization product of .1% to 5% by weight of a cyclic unsubstituted vinyl polysiloxane containing silicon and oxygen atoms and vinyl radicals wherein substantially each of the silicon atoms is bonded to substantially three oxygen atoms and substantially one vinyl radical and 99.9 to 95% by weight of at least one monomer of the formula:

$$H_2C=\underset{R}{C}-\underset{\parallel}{\overset{O}{C}}-OR_1$$

and $R_1$ is a monovalent aliphatic hydrocarbon radical containing from one to five carbon atoms, and R is selected from the group consisting of —H and —CH$_3$, said monomer being capable of polymerizing with said polysiloxane.

8. A transparent shatter-resistant article comprising two transparent polyacrylic resin sheets, said sheets having an adehsive disposed thereinbetween, said adhesive comprising the polymerization product of .1% to 5% by weight of a cyclic unsubstituted vinyl polysiloxane containing silicon and oxygen atoms and vinyl radicals, wherein substantially each of the silicon atoms is bonded to substantially three oxygen atoms and substantially one vinyl radical, and 99.9 to 95% by weight of at least one compound selected from the group consisting of methyl methacrylate, ethyl acrylate, methyl acrylate, ethyl methacrylate, n-butyl acrylate, propyl acrylate, chloroethyl acrylate, butyl methacrylate, propyl methacrylate, butyl acrylate, methyl chloroacrylate, vinyl chloroacrylate, vinyl acrylate, vinyl methacrylate, acrylic acid and methacrylic acid.

9. A transparent shatter-resistant article comprising two transparent polyacrylic resin sheets, said sheets having an adhesive disposed thereinbetween, said adhesive comprising the polymeric product of .1% to 5% by weight of a cyclic unsubstituted vinyl polysiloxane containing silicon and oxygen atoms and vinyl radicals, wherein substantially each of the silicon atoms is bonded to substantially three oxygen atoms and substantially one vinyl radical and 99.9% to 95% by weight of at least one polymer of the formula $$H_2C=\underset{R}{C}-\underset{\parallel}{\overset{O}{C}}-OR_1$$

where R is selected from the group consisting of —H and —CH$_3$ and $R_1$ is a bivalent aliphatic hydrocarbon radical containing from one to five carbon atoms said polymer being capable of copolymerizing with said polysiloxane.

References Cited in the file of this patent
UNITED STATES PATENTS

| | | |
|---|---|---|
| 2,458,032 | Simon | Jan. 4, 1949 |
| 2,464,826 | Neher | Mar. 22, 1949 |
| 2,645,628 | Hurd | July 14, 1953 |
| 2,716,638 | Cohen | Aug. 30, 1955 |
| 2,774,697 | Koblitz | Dec. 18, 1956 |
| 2,983,719 | Cox | May 9, 1961 |

UNITED STATES PATENT OFFICE
CERTIFICATE OF CORRECTION

Patent No. 3,160,551                                December 8, 1964

Ralph W. Buetow et al.

It is hereby certified that error appears in the above numbered patent requiring correction and that the said Letters Patent should read as corrected below.

Column 8, in the first table, third column, line 3 thereof, for "$100°$ C." read -- $160°$ C. --; column 11, line 13, for "adehsive" read -- adhesive --.

Signed and sealed this 6th day of July 1965.

(SEAL)
Attest:

ERNEST W. SWIDER                                EDWARD J. BRENNER
Attesting Officer                                     Commissioner of Patents